United States Patent
Zhang et al.

(10) Patent No.: US 11,317,462 B2
(45) Date of Patent: Apr. 26, 2022

(54) APPARATUS, SYSTEMS, AND METHODS FOR TRANSMITTING LARGE NETWORK CONFIGURATION MESSAGES

(71) Applicant: Apple Inc., Cupertino, CA (US)

(72) Inventors: Dawei Zhang, Saratoga, CA (US); Fangli Xu, Beijing (CN); Haijing Hu, Beijing (CN); Longda Xing, San Jose, CA (US); Murtaza A. Shikari, Mountain View, CA (US); Sethuraman Gurumoorthy, San Jose, CA (US); Sree Ram Kodali, Sunnyvale, CA (US); Srinivasan Nimmala, San Jose, CA (US); Srirang A. Lovlekar, Cupertino, CA (US); Xu Ou, San Jose, CA (US); Yuqin Chen, Shenzhen (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/559,849

(22) Filed: Sep. 4, 2019

(65) Prior Publication Data
US 2020/0146093 A1    May 7, 2020

Related U.S. Application Data

(60) Provisional application No. 62/755,998, filed on Nov. 5, 2018.

(51) Int. Cl.
*H04W 4/00* (2018.01)
*H04W 76/27* (2018.01)
*H04W 48/12* (2009.01)
*H04L 5/00* (2006.01)
*H04W 72/04* (2009.01)
*H04W 80/08* (2009.01)

(52) U.S. Cl.
CPC .......... *H04W 76/27* (2018.02); *H04L 5/0053* (2013.01); *H04W 48/12* (2013.01); *H04W 72/042* (2013.01); *H04W 80/08* (2013.01)

(58) Field of Classification Search
CPC .......................... H04W 80/08; H04W 28/065
See application file for complete search history.

(56) References Cited

U.S. PATENT DOCUMENTS

| 9,215,731 | B2 | 12/2015 | Kitazoe |
| 9,247,452 | B2 | 1/2016 | Xu |
| 9,438,330 | B2 | 9/2016 | Marinier |
| 9,693,209 | B2 * | 6/2017 | Tsutsui ................ H04W 4/90 |

(Continued)

*Primary Examiner* — Bo Hui A Zhu
(74) *Attorney, Agent, or Firm* — Kowert, Hood, Munyon, Rankin & Goetzel, P.C.

(57) ABSTRACT

Apparatuses, systems, and methods for a wireless device to perform methods to communicate an RRC message (such as an RRC configuration message) having a size that exceeds PDCP SDU size constraints. According to some embodiments, a base station may generate a large RRC message, e.g., by encoding an RRC configuration as a single large RRC message. The base station may then segment the RRC message, e.g., at the RRC layer or the PDCP layer, into a series of PDUs that comply with the size constraints. According to some embodiments, the base station may encode an RRC configuration as a series of RRC messages, each complying with the size constraints. The base station may further provide an indication of when a receiving user equipment should apply the RRC configuration.

20 Claims, 10 Drawing Sheets

(56) References Cited

U.S. PATENT DOCUMENTS

| | | |
|---|---|---|
| 9,887,814 B2 | 2/2018 | Hsu |
| 2010/0285791 A1* | 11/2010 | Pirskanen ........... H04W 74/002 |
| | | 455/422.1 |
| 2015/0223221 A1* | 8/2015 | Li .................... H04W 72/0413 |
| | | 370/329 |
| 2016/0269151 A1 | 9/2016 | Maeda |
| 2017/0331670 A1 | 11/2017 | Parkvall |
| 2018/0219791 A1 | 8/2018 | Yu |
| 2018/0279172 A1 | 9/2018 | Lin |
| 2019/0021126 A1 | 1/2019 | Chun |
| 2019/0124181 A1 | 4/2019 | Park |
| 2020/0107223 A1* | 4/2020 | Liu .................... H04W 28/065 |

* cited by examiner

APPARATUS, SYSTEMS, AND METHODS FOR TRANSMITTING LARGE NETWORK CONFIGURATION MESSAGES

PRIORITY CLAIM

This application claims benefit of priority of U.S. provisional application Ser. No. 62/755,998, titled "Apparatus, Systems, and Methods for Transmitting Large Network Configuration Messages", filed Nov. 5, 2018, whose inventors are Haitong Sun et al., which is hereby incorporated by reference in its entirety as though fully and completely set forth herein.

FIELD

The present application relates to wireless devices, and more particularly to apparatus, systems, and methods for communicating large RRC messages in a fifth generation (5G) New Radio (NR) network.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from media access control (MAC) and higher layers. LTE also defines a number of physical layer channels for the uplink (UL).

For example, LTE defines a Physical Downlink Shared Channel (PDSCH) as a DL transport channel. The PDSCH is the main data-bearing channel allocated to users on a dynamic and opportunistic basis. The PDSCH carries data in Transport Blocks (TB) corresponding to a MAC protocol data unit (PDU), passed from the MAC layer to the physical (PHY) layer once per Transmission Time Interval (TTI). The PDSCH is also used to transmit broadcast information such as System Information Blocks (SIB) and paging messages.

As another example, LTE defines a Physical Downlink Control Channel (PDCCH) as a DL control channel that carries the resource assignment for UEs that are contained in a Downlink Control Information (DCI) message. Multiple PDCCHs can be transmitted in the same subframe using Control Channel Elements (CCE), each of which includes nine sets of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

Additionally, LTE defines a Physical Uplink Shared Channel (PUSCH) as a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow for less restrictive UE scheduling as compared to current LTE standards. Consequently, efforts are being made in ongoing developments of 5G-NR to take advantage of the less restrictive UE scheduling in order to further leverage power savings opportunities.

SUMMARY

Embodiments relate to apparatuses, systems, and methods for communicating an RRC configuration having a size that exceeds PDCP SDU size constraints.

According to some embodiments, a base station may encode the RRC configuration as a single large RRC message. The base station may then segment the RRC message, e.g., at the RRC layer or the PDCP layer, into a series of PDUs that comply with the size constraints. According to some embodiments, the base station may encode the RRC configuration as a series of RRC messages, each complying with the PDU size constraints. The base station may further provide an indication of when a receiving user equipment should apply the RRC configuration.

A method is disclosed for communicating a radio resource control (RRC) message. A wireless communication device may generate an RRC message, segment the RRC message into a plurality of segments, and encapsulate the plurality of segments within a plurality of protocol data units (PDUs), wherein each PDU of the plurality of PDUs includes one of the segments. The wireless communication device may transmit one or more signals including the plurality of PDUs.

In some implementations, the plurality of PDUs may be a plurality of RRC PDUs. In other implementations, the plurality of PDUs may be a plurality of PDCP PDUs.

In some implementations, the RRC message may further include header information. the wireless communication device may duplicate the header information within a header of each PDU of the plurality of PDUs. In some scenarios, the header information may include at least one of message type or transaction ID.

In some implementations, each PDU of the plurality of PDUs may include a header, the header including an indication of whether the PDU is a final PDU of the plurality of PDUs.

In some implementations, each PDU of the plurality of PDUs may include a header, the header including an indication of the number of PDUs in the plurality of PDUs and an index uniquely identifying the current PDU among the plurality of PDUs.

Systems and apparatuses are disclosed for implementing methods such as those described above.

The techniques described herein may be implemented in and/or used with a number of different types of devices, including but not limited to cellular phones, base stations, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
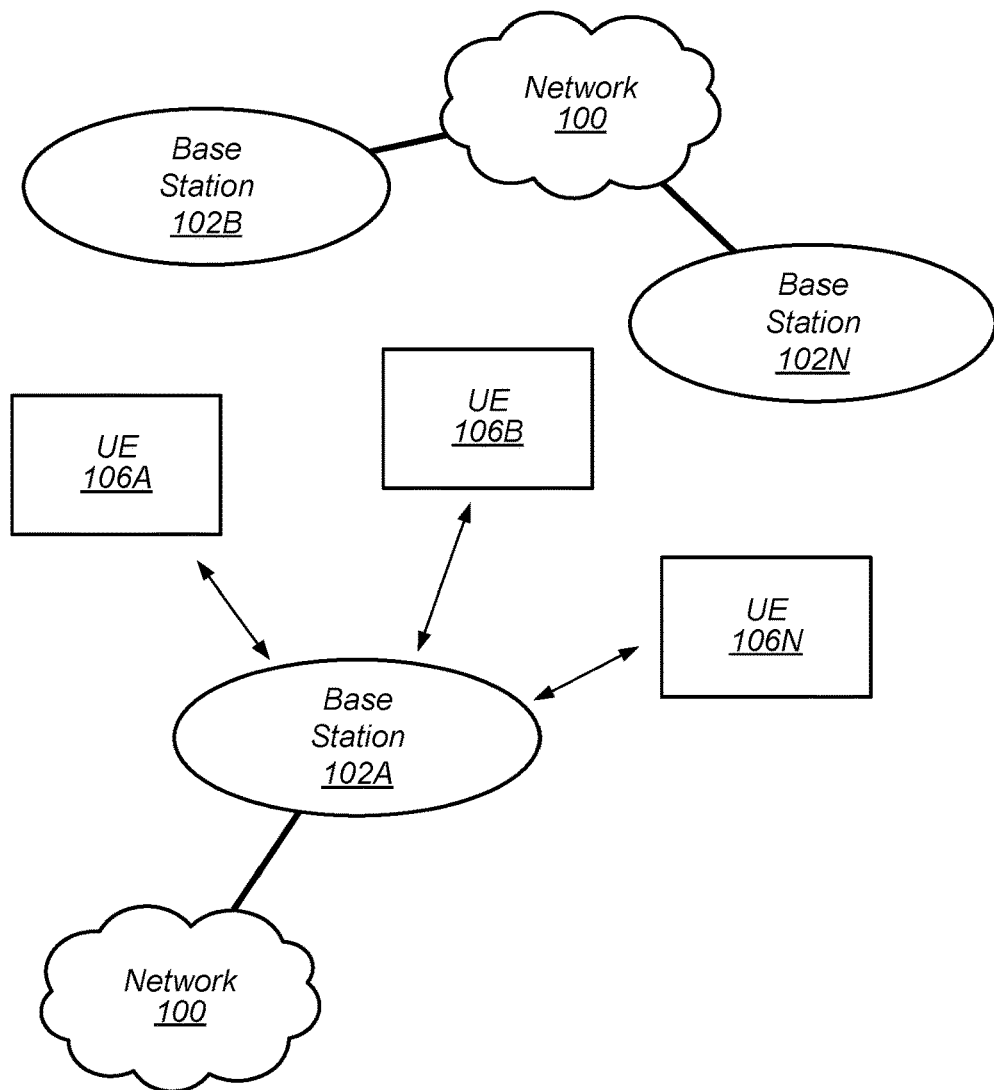
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Figure 2:
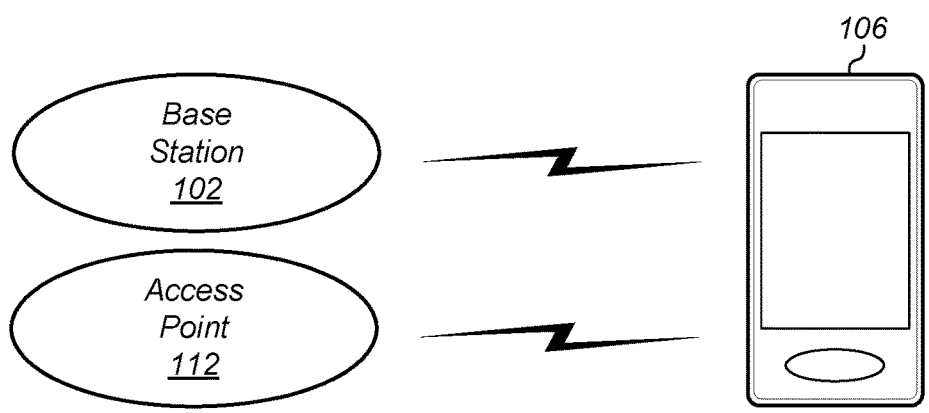
FIG. 2 illustrates an example of a base station (BS) and an access point in communication with a user equipment (UE) device according to some embodiments.

FIGS. 1 and 2—Communication Systems

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTTor LTE or GSM), and separate radios for communicating using each of Wi-Fi and Bluetooth. Other configurations are also possible.

Figure 3:
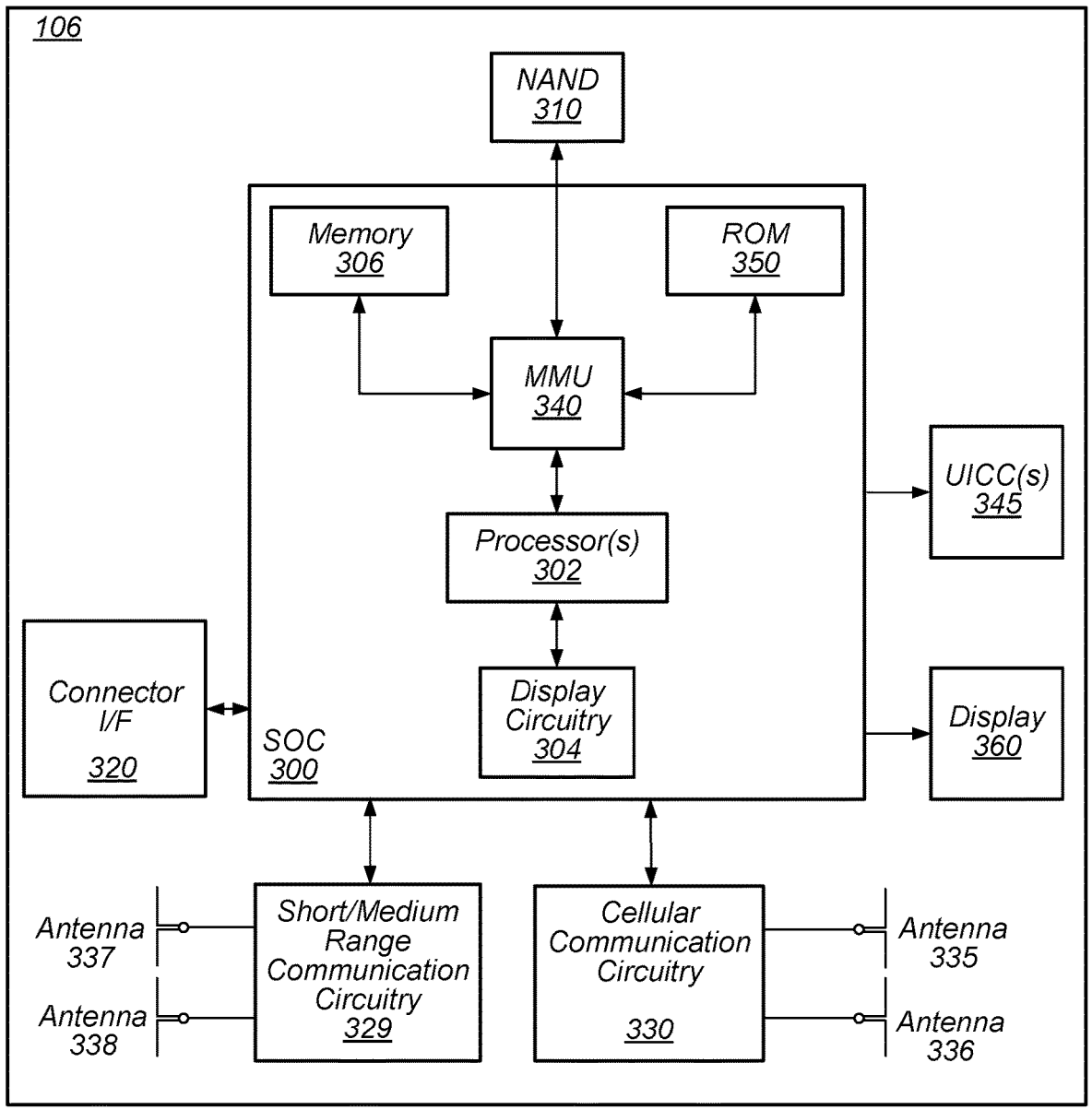
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310); an input/output interface such as connector I/F 320 (e.g., for connecting to a computer system; dock; charging station; input devices, such as a microphone, camera, keyboard; output devices, such as speakers; etc.); the display 360, which may be integrated with or external to the communication device 106; cellular communication circuitry 330, such as for 5G NR, LTE, GSM, etc.; and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods to communicate network configuration messages with a cellular network.

As described herein, the communication device 106 may include hardware and software components for implementing the above features for a communication device 106 to communicate network configuration messages with a cellular network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 may include one or more processing elements to communicate network configuration messages with a cellular network. The cellular communication circuitry 330 may be configured to implement part or all of the features described herein, e.g., by executing program instructions stored on a memory medium (e.g., a non-transitory computer-readable memory medium) and/or by operating an ASIC or other circuitry. For example, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330.

Figure 4:
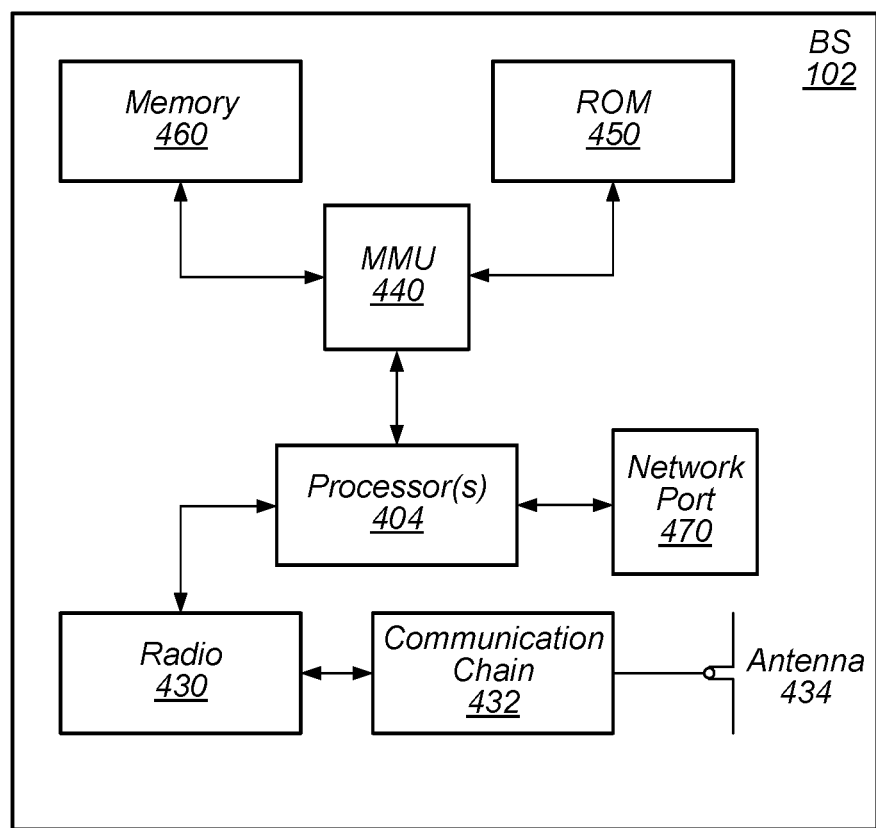
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein, including communicating network configuration messages with one or more devices, such as the UE devices 106. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
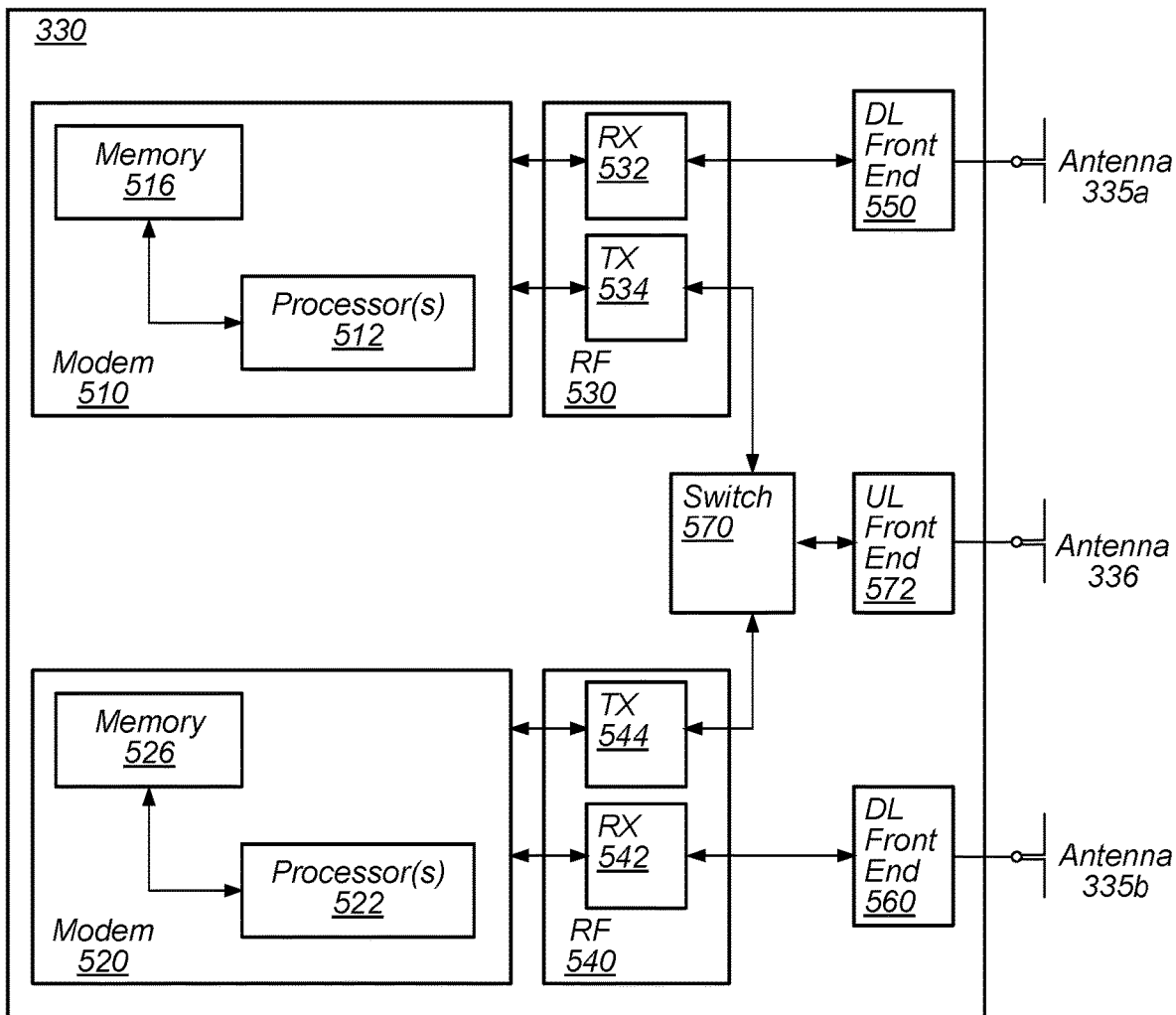
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572). In some scenarios, cellular communication circuitry 330 may receive instructions to transmit according to both the first RAT (e.g., as supported via modem 510) and the second RAT (e.g., as supported via modem 520) simultaneously. In such scenarios, switch 570 may be switched to a third state that allows modem 510 to transmit signals according to the first RAT (e.g., via a transmit chain that includes transmit circuitry 534 and UL front end 572) and modem 520 to transmit signals according to the second RAT (e.g., via a transmit chain that includes transmit circuitry 544 and UL front end 572).

In some embodiments, the cellular communication circuitry 330 may be configured to perform methods to communicate network configuration messages with a cellular network as further described herein.

As described herein, the modem 510 may include hardware and software components for implementing the above features, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

In some embodiments, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some embodiments, the cellular communication circuitry 330 may also not include the switch 570, and the RF front end 530 or the RF front end 540 may be in communication, e.g., directly, with the UL front end 572.

In some embodiments, the cellular communication circuitry 330 may couple (e.g., communicatively; directly or indirectly) to a plurality of antennas 336. For example, each of the FR front end 530 and the RF front end 540 may be connected to a respective antenna 336, e.g., via a respective UL front end 572.

Large RRC Message Size for 5G NR

In NR, the size of RRC messages, such as RRC configuration messages, in some circumstances, may be very large, e.g., due to beam level configuration, among other factors. For example, with maximum values for a one-cell configuration case, example information elements (IEs) of an RRC configuration message may have the following sizes: RACH-ConfigDedicated may be approximately 7 Kbytes; CSI-RS-ResourceConfigMobility may be approximately 1 Kbyte; MeasObjectNR may be approximately 3 Kbytes; and CSI-MeasConfig may be approximately 150 KBytes per carrier. For a multiple-cell configuration case, the RRC configuration message size may be much larger.

According to traditional approaches (e.g., existing cellular standards, such as LTE), RCC messages may be capped at a maximum size that is insufficient to support such configurations. For example, 3GPP currently defines a maximum size of a PDCP SDU as 9000 bytes. This means that the maximum size of one RRC message is also constrained to 9 Kbytes according to such existing definitions.

Figure 6:
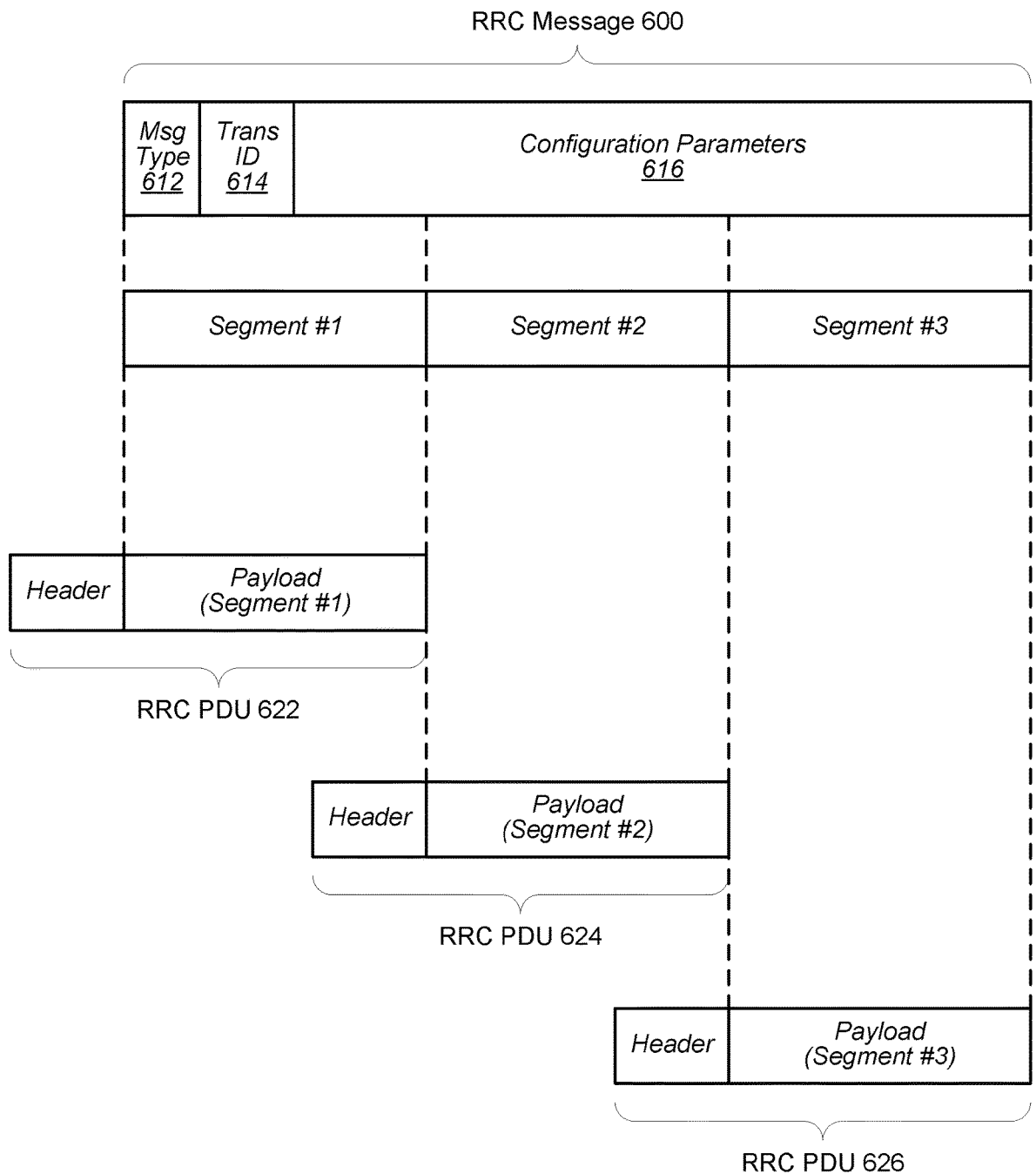
FIG. 6 illustrates an example method of RRC message segmentation, utilizing a series of RRC PDUs to communicate a large RRC message, according to some embodiments.

FIGS. 6-7—Segmenting a Large RRC Message Across RRC PDUs

To address these limitations, a large RRC message may be divided into several RRC PDUs for transmission. For each RRC PDU, the size may be restricted to comply with a maximum PDCP SDU size limitation (e.g., 9 Kbytes). For example, a communications system including at least one base station (e.g., gNB), such as the base station 102, and at least one mobile device, such as the UE 106, may support RRC message segmentation and concatenation at the RRC layer.

FIG. 6 illustrates an example of RRC message segmentation, utilizing a series of RRC PDUs to communicate a large RRC message (such as an RRC configuration message), according to some embodiments. As shown in FIG. 6, a transmitting device, such as a base station 102 (and/or other network component) or a UE 106, may generate an RRC message for transmission to a receiving device, such as the UE 106 or the base station 102. For example, the transmitting device may encode an RRC configuration as a single RRC message 600, e.g., at the RRC layer. The RRC message 600 may include, e.g., RRC configuration parameters 616 for the receiving device, as well as various header information, such as a message type 612 (e.g., RRC-MessageType) and/or a transaction identifier 614 (e.g., RRC-TransactionIdentifier). However, it should be understood that the method described in connection with FIG. 6 may also be applied to RRC messages containing information other than an RRC configuration.

The transmitting device may then segment the encoded RRC message, e.g., in response to a determination that the RRC message meets (or exceeds) a threshold size. As illustrated, the RRC message 600 is segmented into three segments (segment #1, segment #2, and segment #3). However, it should be understood that, in other scenarios, the RRC message 600 may be segmented into other numbers of segments. For example, the RRC message 600 may be segmented into any number of segments that is appropriate, e.g., to ensure that each segment accommodates packet size constraints, such as a maximum PDCP SDU size. In some scenarios, the RRC message 600 may be segmented into segments of equal size. In other embodiments, one or more of the segments may differ in size.

The transmitting device may package the segments as a series of RRC PDUs, e.g., by adding an RRC header to each of the segments. Specifically, each RRC PDU may include a payload including a respective segment of the encoded RRC message 600. As illustrated, the payload of RRC PDU 622 includes (e.g., consists of) segment #1, the payload of RRC PDU 624 includes segment #2, and the payload of RRC PDU 626 includes segment #3. The header may include information to facilitate further processing of the RRC PDU by the transmitting device and/or by the receiving device.

After generating the series of RRC PDUs at the RRC layer, the transmitting device may further process the RRC PDUs (e.g., through PDCP, RLC, MAC, and PHY layers) and transmit the resulting packet(s) to the receiving device.

Upon receiving the packet(s), the receiving device may extract the RRC PDUs (e.g., through PHY, MAC, RLC, and PDCP layers). The receiving device may, e.g., at the RRC layer, store extracted RRC PDU(s) (or their payloads) until all RRC PDUs in the series have been received. Upon extracting the RRC PDUs, the receiving device may, e.g., at the RRC layer, reassemble the RRC message. For example, the receiving device may extract and concatenate the payloads of the RRC PDUs (e.g., the RRC message segments). The headers of the RRC PDUs may include information to assist in properly concatenating the payloads.

The concatenated payloads from the entire series of RRC PDUs should constitute the entire encoded RRC message 600. Thus, once the payloads have been concatenated, the receiving device may decode the RRC message 600.

In response to PDCP or RLC re-establishment, the RRC layer of the receiving device may discard any stored payloads extracted from the RRC PDUs (e.g., the RRC message segments).

Figure 7A:
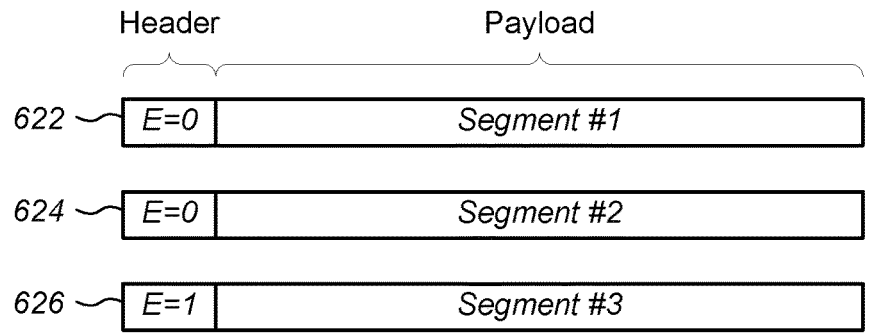
FIGS. 7A-7C illustrate examples of possible RRC PDU header configurations, according to some embodiments.
Figure 7B:
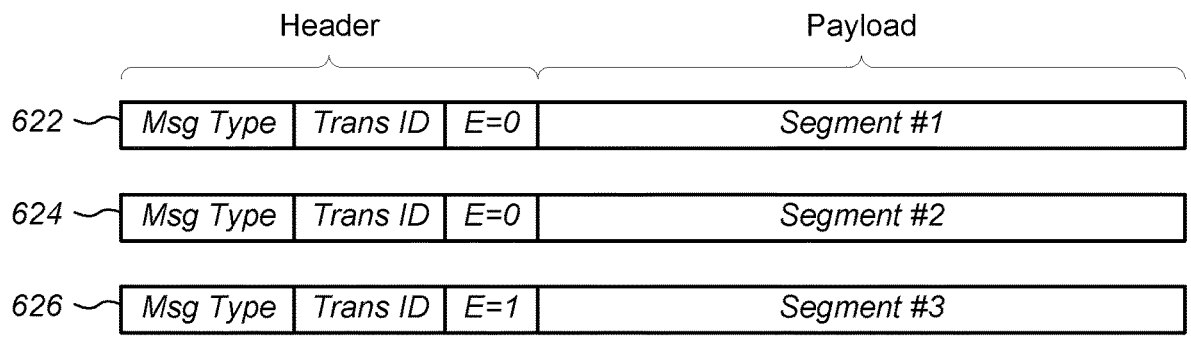
Figure 7C:
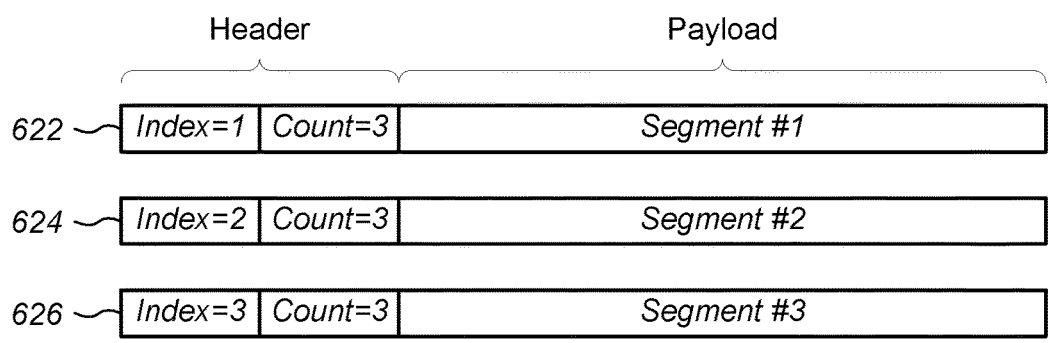

FIGS. 7A-7C illustrate examples of possible RRC PDU header configurations, according to some embodiments.

FIG. 7A illustrates a first example of the series of RRC PDUs including 622, 624, and 626, as shown in FIG. 6. In the example of FIG. 7A, the header of each of the RRC PDUs may include an end-marker indicating whether the respective RRC PDU is the final RRC PDU in the series. For example, an end-marker field within the RRC PDU header may have a first value (e.g., "1") when the RRC PDU is the last RRC PDU in the series (including instances when the RRC message was not segmented). As illustrated, the RRC PDU 626 includes an end-marker field having the first value, indicating that the RRC PDU 626 is the final RRC PDU in the series. The end-marker field may have a second value (e.g., "0") when the RRC PDU is not the last RRC PDU in the series. As illustrated, the RRC PDUs 622 and 624 each include an end-marker field having the second value. In some embodiments, the RRC PDU header may include additional information (not shown).

Upon extracting the RRC PDUs, the receiving device may, e.g., at the RRC layer, utilize the values of the end-marker fields in reassembling the RRC message. For example, the receiving device may extract and store the payloads of the RRC PDUs (e.g., the RRC message segments) until receiving an RRC PDU that has a header including an end-marker field indicating the RRC PDU is the final RRC PDU in the series. For example, the receiving device may determine whether the end marker of a received RRC PDU has the first value (e.g., "1") or the second value (e.g., "0"). If the end-marker has the second value, the receiving device may store the payload, e.g., in order with previously stored payloads. If the end-marker has the first value—thus indicating the end of the series of RRC PDUs—the receiving device may concatenate the payload of the RRC PDU with the stored payloads and decode the resulting RRC message.

FIG. 7B illustrates a second example of the series of RRC PDUs including 622, 624, and 626, as shown in FIG. 6. In the example of FIG. 7B, the header of each of the RRC PDUs may include the end-marker field as described with regard to FIG. 7A. The header may also include a message type field and/or a transaction identifier field, identifying a message type and/or a transaction identifier of the RRC message 600. For example, the message type field may include the message type 612 and the transaction identifier field may include the transaction identifier 614.

Upon extracting the RRC PDUs, the receiving device may, e.g., at the RRC layer, utilize the values included in the headers in reassembling the RRC message. For example, when reassembling the RRC message 600, the receiving device may concatenate only those RRC PDU payloads having the appropriate (e.g., the same) message type and transaction identifier. Thus, inclusion of the message type and transaction identifier fields may allow the transmitting device to intersperse the RRC PDUs containing the RRC message 600 among other RRC PDUs having another message type and/or another transaction identifier. However, this comes at the cost of including additional overhead resulting from the additional header bits included in each RRC PDU.

FIG. 7C illustrates a third example of the series of RRC PDUs including 622, 624, and 626, as shown in FIG. 6. In the example of FIG. 7C, the header of each of the RRC PDUs may include an index field and a count field. Specifically, the count field may indicate the total number of RRC PDUs included in the series—e.g., the total number of RRC PDUs that contain a segment of the current encoded RRC message or the total number of segments into which the encoded RRC message was split. As illustrated in FIG. 7C, each of the three RRC PDUs 622, 624, and 626 includes a count field having a value of 3. The index field may uniquely identify each RRC PDU within the series and may, e.g., indicate the position of the RRC PDU within the series. As illustrated in FIG. 7C, the RRC PDU 622 includes an index field having a value of 1, the RRC PDU 624 includes an index field having a value of 2, and the RRC PDU 626 includes an index field having a value of 3.

Upon extracting the RRC PDUs, the receiving device may, e.g., at the RRC layer, store the payloads of the RRC PDUs until each segment has been received. For example, the RRC layer may store the payloads until it has received RRC PDUs having each index value up to the value of the count field. Once all of the segments have been concatenated (as indicated by the index and count fields), the receiving device may decode the resulting RRC message.

Although the headers illustrated in FIG. 7C may require more header data in each RRC PDU header than the headers illustrated in FIG. 7A, the headers of FIG. 7C may provide an additional means of verifying that all segments of the RRC message 600 have been received. Additionally, the index values may allow the RRC layer of the receiving device to reconstruct the encoded RRC message even if the segments are received out of order.

In some scenarios, the headers of the RRC PDUs of FIG. 7C may include additional information, such as the message type and transmission identifier fields discussed with regard to FIG. 7B.

The methods demonstrated by FIGS. 6-7 offer the benefit of allowing the segmentation and concatenation of the RRC message 600 to be performed entirely at the RRC layer, without any modification to other layers as present in legacy systems, while still complying with a 9 Kbyte limit in PDCP SDU size.

Figure 8:
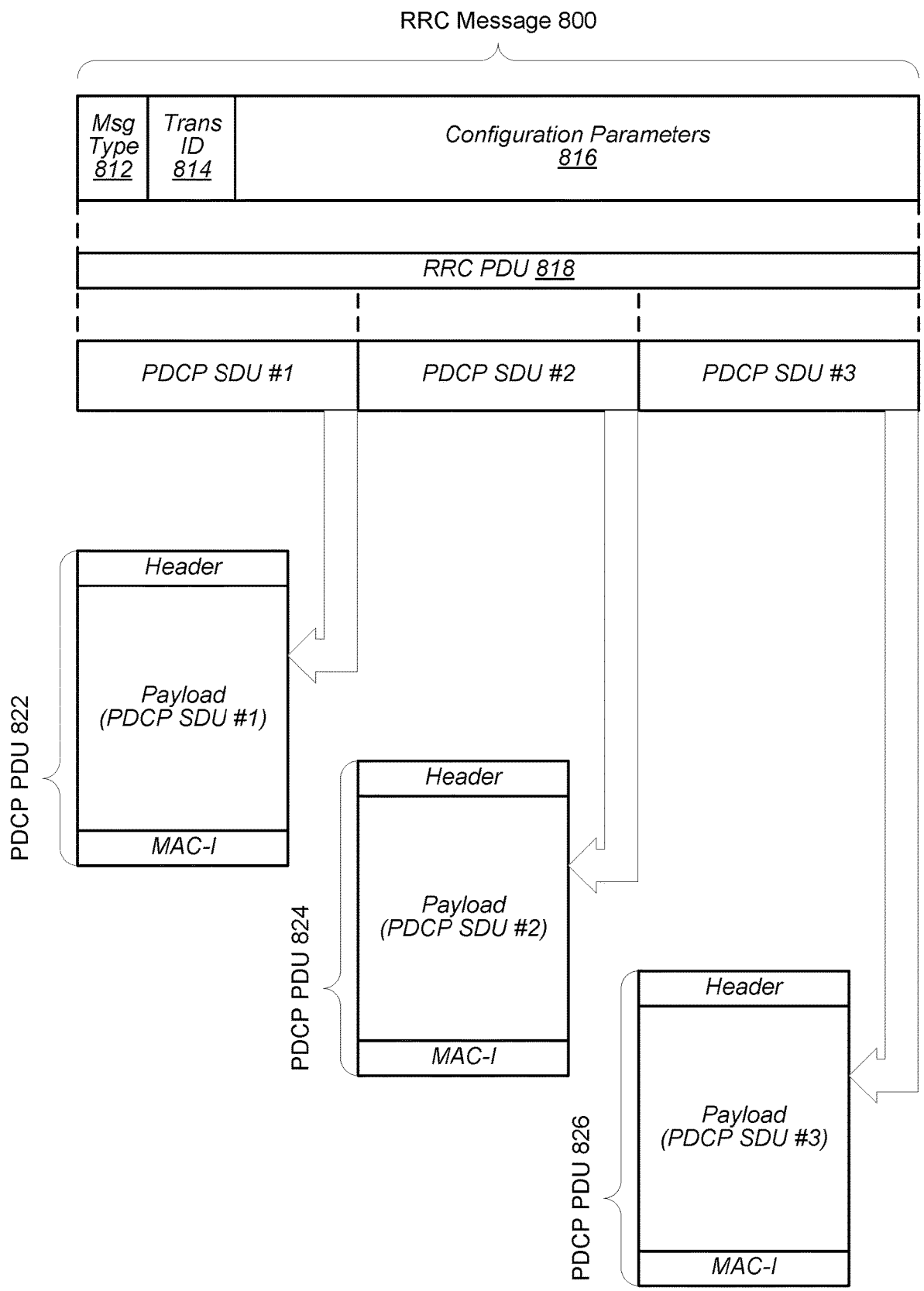
FIG. 8 illustrates an example method of RRC message segmentation, utilizing a series of PDCP PDUs to communicate a large RRC message, according to some embodiments.

FIG. 8—Segmenting a Large RRC Message Across PDCP PDUs

As an alternative means to address the limitations of the prior art, a large RRC message may be packaged as a single large RRC PDU, which may then be divided into several PDCP SDUs, which may then be further processed for transmission. For each PDCP SDU, the size may be restricted to comply with a maximum size limitation (e.g., 9 Kbytes). For example, a communications system including at least one base station (e.g., gNB), such as the base station 102, and at least one mobile device, such as the UE 106, may support RRC message segmentation and concatenation at the PDCP layer.

FIG. 8 illustrates an example of RRC message segmentation, utilizing a series of PDCP PDUs to communicate a large RRC message (such as an RRC configuration message), according to some embodiments. As shown in FIG. 8, a transmitting device, such as a base station 102 (and/or other network component) or a UE 106, may generate an RRC message for transmission to a receiving device, such as the UE 106 or the base station 102. For example, the transmitting device may encode an RRC configuration as a single RRC message 800, e.g., at the RRC layer. The RRC message 800 may include, e.g., RRC configuration parameters 816 for the receiving device, as well as various header information, such as a message type 812 (e.g., RRC-MessageType) and/or a transaction identifier 814 (e.g., RRC-TransactionIdentifier). In some scenarios, the RRC message 800 may be similar, or identical, to the RRC message 600 of FIG. 6. It should be understood that the method described in connection with FIG. 8 may also be applied to RRC messages containing information other than an RRC configuration.

The transmitting device may package the RRC message 800 as a single large RRC PDU 818. Thus, the RRC PDU 818 may have a payload including the entire RRC message 800. The RRC PDU 818 may, in some scenarios also include other information, such as a header (not shown). The RRC PDU 818 may then be passed from the RRC layer of the transmitting device to the PDCP layer of the transmitting device. In some scenarios, additional information may be separately passed from the RRC layer to the PDCP layer, such as the values of the message type field 812 and/or the transmission identifier field 814.

Upon receiving the RRC PDU 818, the PDCP layer may segment it into a plurality of PDCP SDUs, e.g., in response to a determination that the RRC PDU 818 meets (or exceeds) a threshold size. As illustrated, the RRC PDU is segmented into three PDCP SDUs (PDCP SDU #1, PDCP SDU #2, and PDCP SDU #3). However, it should be understood that, in other scenarios, the RRC PDU 818 may be segmented into other numbers of PDCP SDUs. For example, the RRC PDU 818 may be segmented into any number of PDCP SDUs that is appropriate, e.g., to ensure that each PDCP SDU accommodates packet size constraints, such as a maximum PDCP SDU size. In some scenarios, the RRC PDU 818 may be segmented into PDCP SDUs of equal size. In other embodiments, one or more of the PDCP SDUs may differ in size.

The transmitting device may package the PDCP SDUs as a series of PDCP PDUs, e.g., by adding to each of the PDCP SDUs a PDCP header and possibly one or more additional fields, such as a Message Authentication Code—Integrity (MAC-I) field. Specifically, each PDCP PDU may include a payload including a respective PDCP SDU containing a segment of the RRC message 800. As illustrated, the payload of PDCP PDU 822 includes (e.g., consists of) PDCP SDU #1, the payload of PDCP PDU 824 includes PDCP SDU #2, and the payload of PDCP PDU 826 includes PDCP SDU #3. The header may include information to facilitate further processing of the PDCP PDU by the transmitting device and/or by the receiving device.

After generating the series of PDCP PDUs at the PDCP layer, the transmitting device may further process the PDCP PDUs (e.g., through RLC, MAC, and PHY layers) and transmit the resulting packet(s) to a receiving device. Each PDCP PDU may be individually ciphered and integrity protected.

Upon receiving the packet(s), the receiving device may extract the PDCP PDUs (e.g., through PHY, MAC, and RLC layers), and may unpack their payloads; e.g., the PDCP SDUs representing segments of the RRC PDU 818. The receiving device may, e.g., at the PDCP layer, store extracted PDCP PDUs, or their PDCP SDU payloads, until all PDCP PDUs in the series have been received. Upon receiving all of the PDCP SDUs, the receiving device may, e.g., at the PDCP layer, concatenate the PDCP SDUs to reassemble the single RRC PDU 818. The headers of the PDCP PDUs may include information to assist in properly concatenating the PDCP SDUs.

Once the PDCP SDUs have been concatenated to reassemble the RRC PDU 818, the receiving device may pass the RRC PDU 818 from the PDCP layer to the RRC layer.

The PDCP layer may discard any PDCP SDUs that have not yet been delivered to the higher layers upon the occurrence of PDCP Re-establishment and/or PDCP Entity Release.

Upon receiving the RRC PDU 818, the RRC layer of the receiving device may decode the RRC message 800.

Figure 9A:
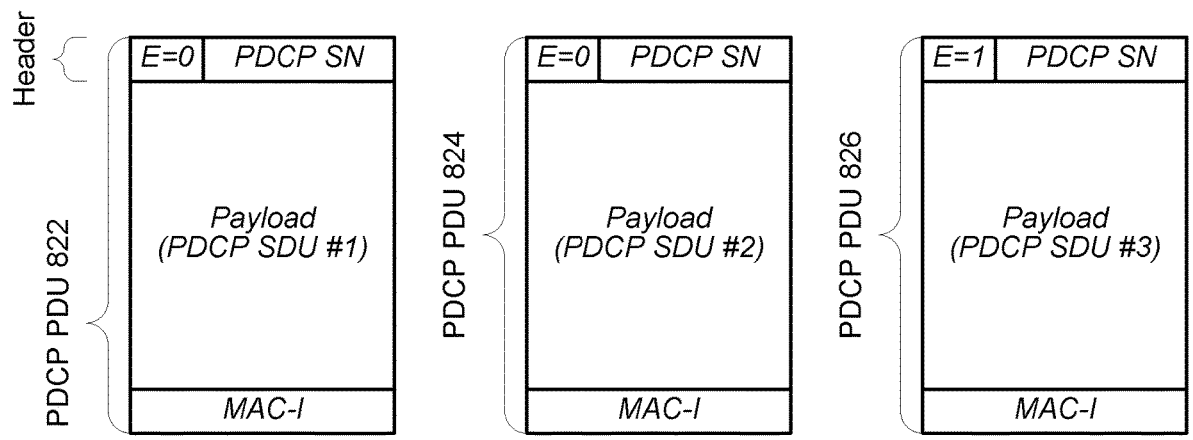
FIGS. 9A-C illustrate examples of possible PDCP PDU header configurations, according to some embodiments.
Figure 9B:
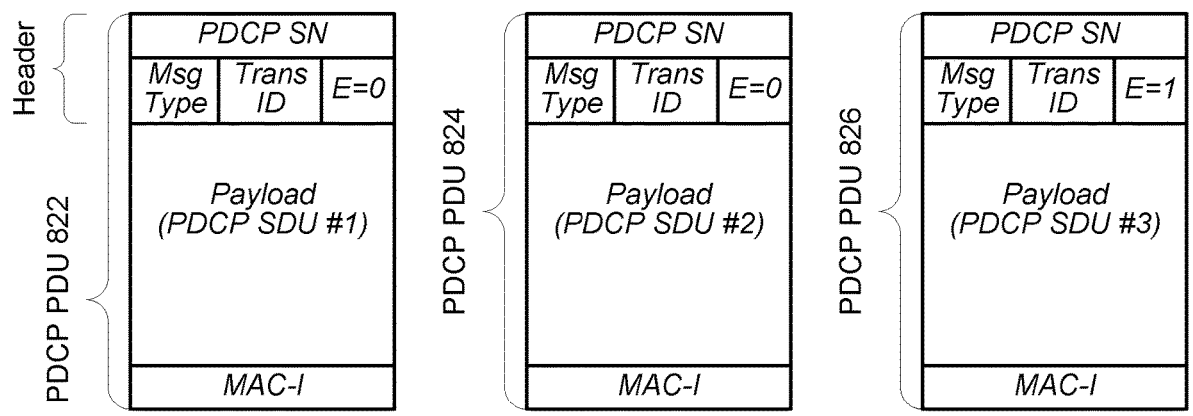
Figure 9C:
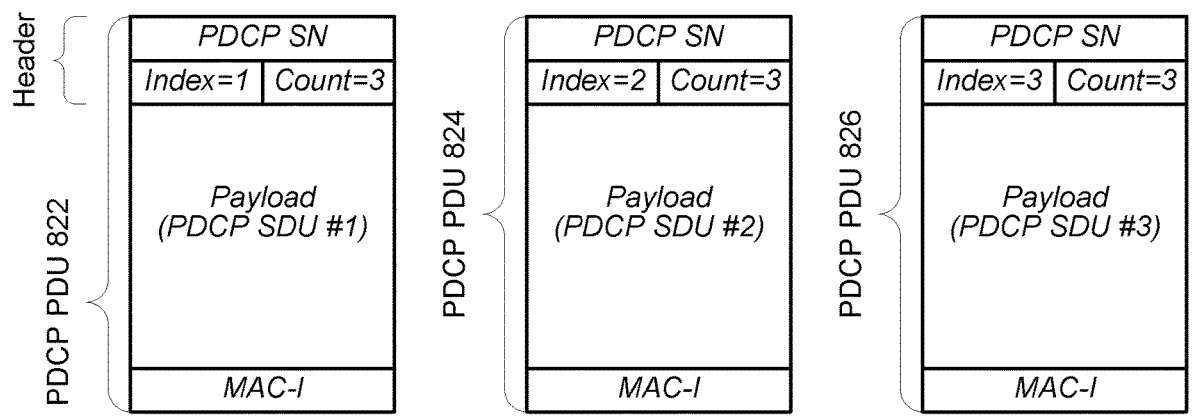

FIGS. 9A-C illustrate examples of possible PDCP PDU header configurations, according to some embodiments.

FIG. 9A illustrates a first example of a series of PDCP PDUs 822, 824, and 826, as shown in FIG. 8. In the example of FIG. 9A, the header of each of the PDCP PDUs may include an end-marker indicating whether the respective PDCP PDU is the final PDCP PDU in the series. For example, an end-marker field within the PDCP PDU header may have a first value (e.g., "1") when the PDCP PDU is the last PDCP PDU in the series (including instances when the RRC PDU 818 was not segmented). As illustrated, the PDCP PDU 826 includes an end-marker field having the first value, indicating that the PDCP PDU 826 is the final PDCP PDU in the series. The end-marker field may have a second value (e.g., "0") when the PDCP PDU is not the last PDCP PDU in the series. As illustrated, the PDCP PDUs 822 and 824 each include an end-marker field having the second value. In some embodiments, the PDCP PDU header may include additional information, such as a PDCP sequence number (SN) field.

Upon extracting the PDCP PDUs, the receiving device may, e.g., at the PDCP layer, utilize the values of the end-marker fields in reassembling the RRC PDU 818. For example, the receiving device may extract and store the payloads of the PDCP PDUs (e.g., the PDCP SDUs) until receiving a PDCP PDU that has a header including an end-marker field indicating the PDCP PDU is the final PDCP PDU in the series. For example, the receiving device may determine whether the end marker of a received PDCP PDU has the first value (e.g., "1") or the second value (e.g., "0"). If the end-marker has the second value, the receiving device may store the payload, e.g., in order with previously stored payloads. If the end-marker has the first value—thus indicating the end of the series of PDCP PDUs—the receiving device may concatenate the payload of the PDCP PDU with the stored payloads and pass the resulting RRC PDU 818 to the RRC layer.

In some scenarios, the end-marker field may utilize an existing field (e.g., a reserved bit) that is already present in a PDCP PDU header as defined by legacy systems (e.g., LTE standards). Thus, including the end-marker within the PDCP PDU header may allow proper concatenation of the PDCP SDUs without adding any overhead bits to the PDCP PDU.

FIG. 9B illustrates a second example of the series of PDCP PDUs including 822, 824, and 826, as shown in FIG. 8. In the example of FIG. 9B, the header of each of the PDCP PDUs may include the end-marker field as described with regard to FIG. 9A. The header may also include a message type field and/or a transaction identifier field, identifying a message type and/or a transaction identifier of the RRC message 800. For example, the message type field may include the message type 812 and the transaction identifier field may include the transaction identifier 814. As noted above, the values of these fields may be provided to the PDCP layer by the RRC layer.

Upon extracting the PDCP PDUs, the receiving device may, e.g., at the PDCP layer, utilize the values included in the headers in reassembling the RRC PDU 818. For example, when reassembling the RRC PDU 818, the receiving device may concatenate only those PDCP PDU payloads having the appropriate (e.g., the same) message type and transaction identifier. Thus, inclusion of the message type and transaction identifier fields may allow the transmitting device to intersperse the PDCP PDUs containing segments of the RRC message 800 among other PDCP PDUs having another message type and/or another transaction identifier. However, this comes at the cost of including additional overhead resulting from the additional header bits included in each PDCP PDU.

FIG. 9C illustrates a third example of the series of PDCP PDUs including 822, 824, and 826, as shown in FIG. 8. In the example of FIG. 9C, the header of each of the PDCP PDUs may include an index field and a count field. Specifically, the count field may indicate the total number of PDCP PDUs included in the series—e.g., the total number of PDCP PDUs that contain a segment of the RRC PDU 818 or the total number of segments into which the RRC PDU 818 was split. As illustrated in FIG. 9C, each of the three PDCP PDUs 822, 824, and 826 includes a count field having a value of 3. The index field may uniquely identify each PDCP PDU within the series and may, e.g., indicate the position of the PDCP PDU within the series. As illustrated in FIG. 9C, the PDCP PDU 822 includes an index field having a value of 1, the PDCP PDU 824 includes an index field having a value of 2, and the PDCP PDU 826 includes an index field having a value of 3.

Upon extracting the PDCP PDUs, the receiving device may, e.g., at the PDCP layer, store the payloads of the PDCP PDUs (e.g., the PDCP SDUs) until all PDCP PDUs in the series have been received. For example, the PDCP layer may store the payloads until it has received PDCP PDUs having each index value up to the value of the count field. Once all of the PDCP SDUs have been concatenated (as indicated by the index and count fields), the receiving device may pass the resulting RRC PDU 818 to the RRC layer.

Although the headers illustrated in FIG. 9C may require more header data in each PDCP PDU header than the headers illustrated in FIG. 9A, the headers of FIG. 9C may provide an additional means of verifying that all segments of the RRC message 800 have been received. Additionally, the index values may allow the PDCP layer of the receiving device to reconstruct the RRC PDU 818 even if the segments are received out of order.

In some scenarios, the headers of the PDCP PDUs of FIG. 9C may include additional information, such as the message type and transmission identifier fields discussed with regard to FIG. 9B.

The methods demonstrated by FIGS. 8-9 offer the benefit of allowing the segmentation and concatenation of the RRC message 800 to be performed entirely at the PDCP layer, without any modification to other layers as present in legacy systems, while still complying with a 9 Kbyte limit in PDCP SDU size. Additionally, in some implementations, the PDCP layer may be better suited than the RRC layer to performing segmentation and concatenation functions.

Figure 10:
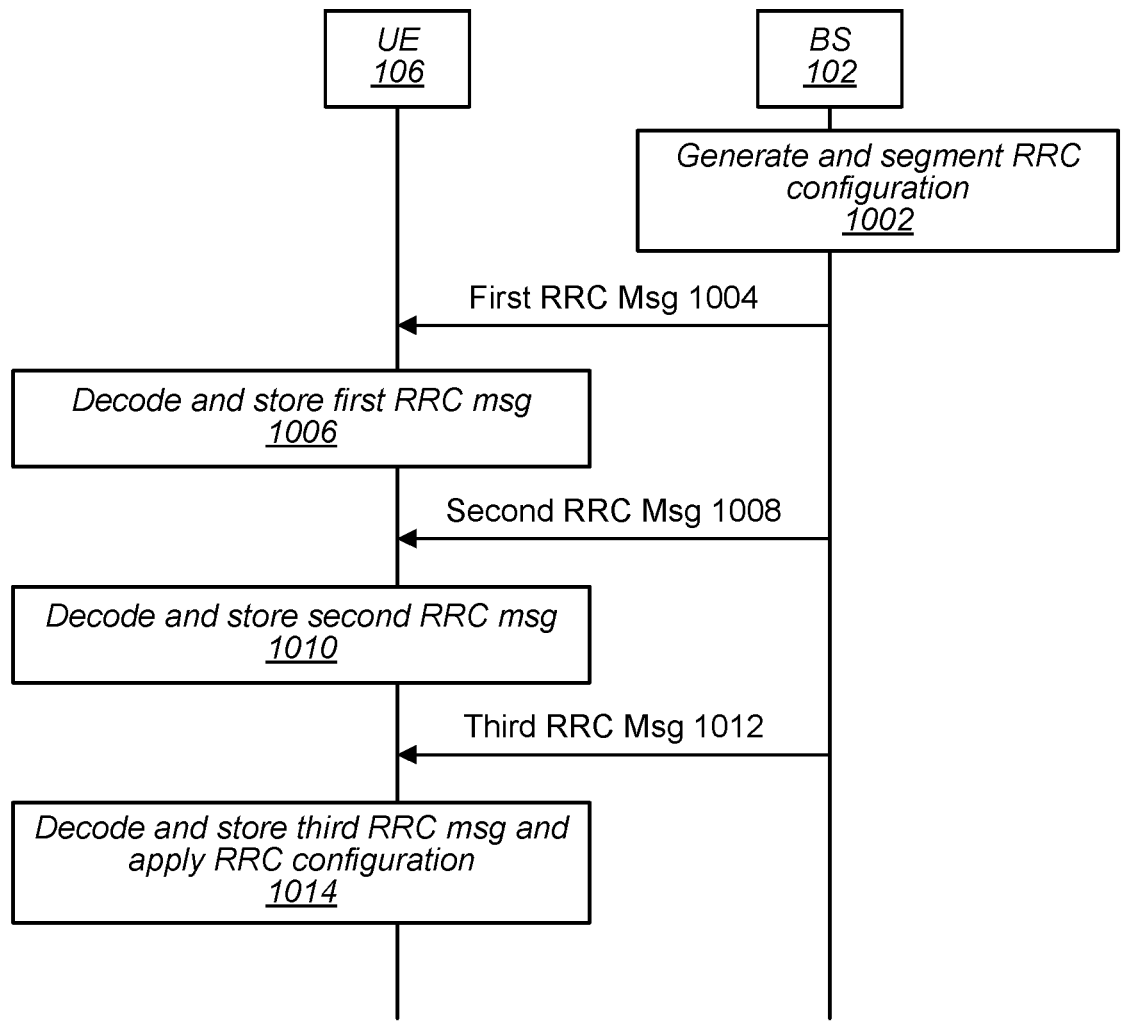
FIGS. 10-11 illustrate example signal flows for communicating a large RRC configuration as a series of RRC messages, according to some embodiments.
Figure 11:
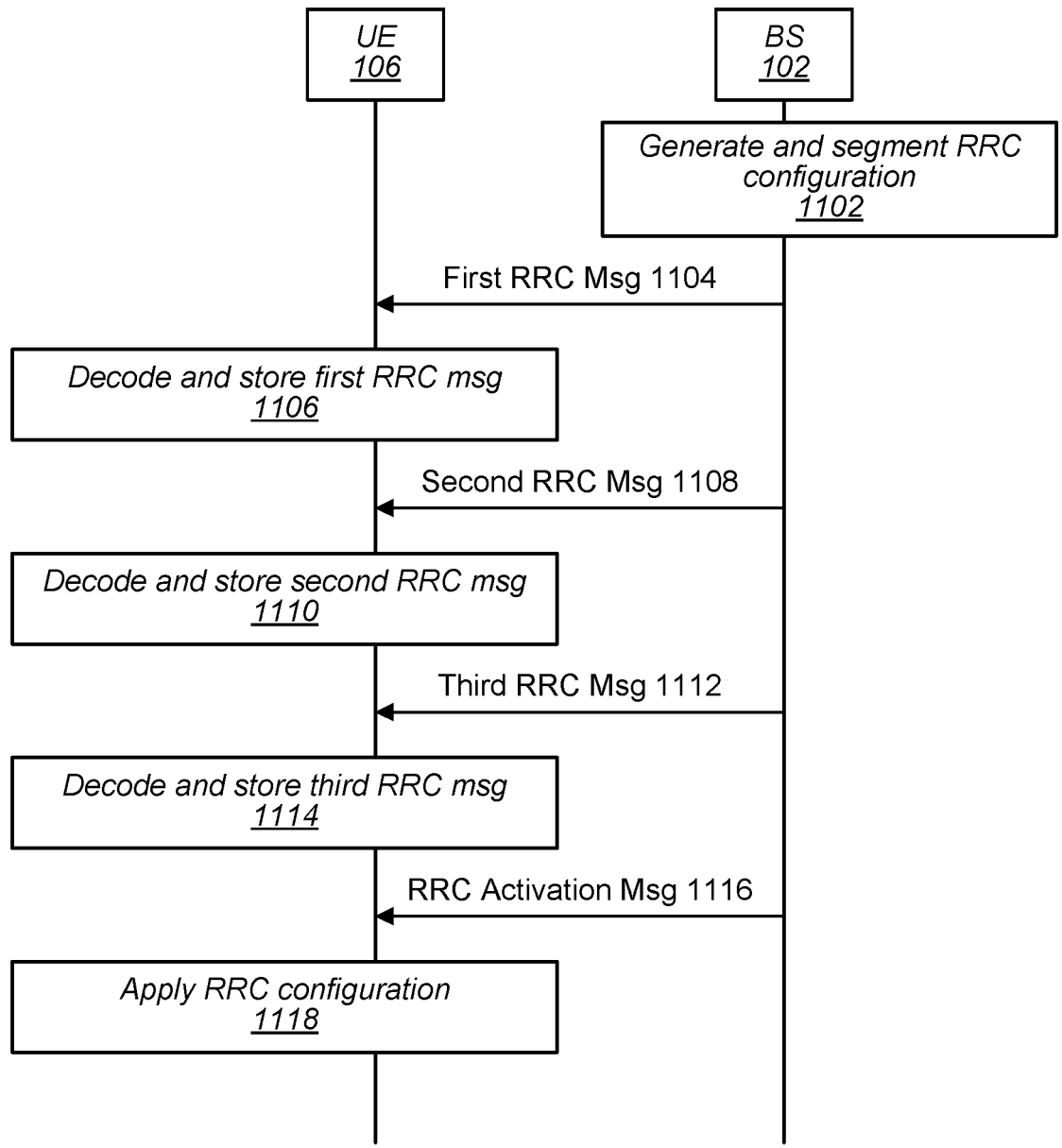

FIGS. 10-11—Multiple RRC Messages for a single RRC Configuration

As an alternative solution to the limitations of the prior art, a cellular network may separate one RRC configuration into multiple RRC messages, e.g., at the transmitting device.

FIG. 10 illustrates a first example of communicating multiple RRC messages for a single RRC configuration. In this example, instead of encoding an RRC configuration as a single RRC message that is later segmented, the base station (or other network element) may instead separate the RRC configuration into multiple RRC messages. Each RRC message may contain a portion of the RRC configuration, but may comply with any maximum size constraints.

As shown in FIG. 10, a base station, such as the base station 102, or other network device, may, at 1002, generate RRC configuration information and segment the information into a plurality of information sets. At 1004, the base station 102 may transmit a first RRC message 1004 to a receiving device, such as the UE 106. The first RRC message 1004 may include a first of the information sets. An RRC PDU header of the first RRC message 1004 may include an end-marker field (e.g., similar to that described in connection with FIG. 7A). The end-marker field of the first RRC message 1004 may indicate that the first RRC message 1004 is not the final RRC message of the series (e.g., may have a value of "0").

At 1006, the UE 106 may receive and decode the first RRC message 1004. The UE 106 may store the RRC configuration information included in the first RRC message 1004 (e.g., the first of the information sets). In response to the end-marker field of the first RRC message 1004, the UE 106 may not apply the RRC configuration specified by the first RRC message 1004, but may instead continue to await further RRC message(s).

At 1008, the base station 102 may transmit to the UE 106 a second RRC message 1008, which may include a second of the information sets. An RRC PDU header of the second RRC message 1008 may include an end-marker field, indicating that the second RRC message 1008 is not the final RRC message of the series (e.g., may have a value of "0").

At 1010, the UE 106 may receive and decode the second RRC message 1008. The UE 106 may store the RRC configuration information included in the second RRC message 1008 (e.g., the second of the information sets). The UE 106 may continue to await further RRC message(s), e.g., in response to the end-marker field of the second RRC message 1008.

At 1012, the base station 102 may transmit to the UE 106 a third RRC message 1012, which may include a third of the information sets. An RRC PDU header of the third RRC message 1012 may include an end-marker field, indicating that the third RRC message 1012 is the final RRC message of the series (e.g., may have a value of "1").

At 1014, the UE 106 may receive and decode the third RRC message 1012. Upon determining that the third RRC message 1012 includes an end-marker field indicating that the third RRC message 1012 is the final RRC message of the series, the UE 106 may internally apply the RRC configuration specified by the series of RRC messages 1004, 1008, and 1012. Thus, the end-marker field may serve the function of indicating when the receiving device should implement the RRC configuration.

FIG. 11 illustrates a second example of communicating multiple RRC messages for a single RRC configuration. As in FIG. 10, the base station (or other network element) may separate the RRC configuration into multiple RRC messages. Each RRC message may contain a portion of the RRC configuration, but may comply with any maximum size constraints.

As shown in FIG. 11, a base station, such as the base station 102, or other network device, may, at 1102, generate RRC configuration information and segment the information into a plurality of information sets. At 1104, the base station 102 may transmit a first RRC message 1104 to a receiving device, such as the UE 106. The first RRC message 1104 may include a first of the information sets. Similarly, the base station 102 may transmit a second RRC message 1108, including a second of the information sets, and a third RRC message 1112, including a third of the information sets. However, in contrast to FIG. 10, RRC PDU headers of the RRC messages 1104, 1108, and 1112 may not include an end-marker field. Instead, the transmitting device may transmit an additional message, following transmission of all of the RRC messages that include a portion of the RRC configuration. The additional message may be referred to as an RRC activation message 1116.

The receiving device may receive and decode each message 1104, 1108, and 1112, at 1106, 1110, and 1114, respectively, and may store the RRC configuration information included in each of the RRC messages. The receiving device may also, at 1118, receive and decode the RRC activation message 1116. In response to the RRC activation message 1116, the receiving device may internally apply the RRC configuration specified by the series of RRC messages 1104, 1108, and 1112. Thus, the RRC activation message 1116 may serve the function of indicating when the receiving device should implement the RRC configuration.

In connection with any of the foregoing methods, the receiving device may report to the cellular network, e.g., during initial connection, that the UE is capable of supporting one or more of the disclosed methods.

Example Implementations

Examples of the methods and systems disclosed herein may be illustrated in the following implementations.

A method for receiving a radio resource control (RRC) configuration, may include: by a wireless communication device: receiving one or more signals comprising a plurality of PDUs; extracting a plurality of payloads from respective PDUs of the plurality of PDUs; concatenating the plurality of payloads into an RRC message comprising information defining the RRC configuration; decoding the RRC message; and configuring the UE according to the RRC configuration.

In some implementations, the plurality of PDUs may be a plurality of RRC PDUs. In some implementations, the plurality of PDUs may be a plurality of PDCP PDUs.

In some implementations, the RRC message may further include header information, wherein each PDU of the plurality of PDUs includes at least a subset of the header information of the RRC message.

In some implementations, the header information may include at least one of message type or transaction ID.

In some implementations, the header information may include an indication of whether the PDU is a final PDU of the plurality of PDUs.

In some implementations, each PDU of the plurality of PDUs may include a header, the header including an indication of the number of PDUs in the plurality of PDUs and an index uniquely identifying the current PDU among the plurality of PDUs.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or a base station 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
   a memory storing software instructions; and
   at least one processor configured to execute the software instructions to cause the apparatus to:
   generate an RRC message;
   segment the RRC message into a plurality of segments;
   encapsulate the plurality of segments within a plurality of protocol data units (PDUs), wherein each PDU of the plurality of PDUs comprises one of the segments, wherein respective PDUs of the plurality of PDUs include different segment identifiers and are associated with the same transaction identifier, wherein the transaction identifier identifies the PDUs that include the segments of the RRC message; and
   transmit one or more signals comprising the plurality of PDUs.

2. The apparatus of claim 1, wherein the plurality of PDUs are a plurality of RRC PDUs.

3. The apparatus of claim 1, wherein the plurality of PDUs are a plurality of PDCP PDUs.

4. The apparatus of claim 1, wherein the RRC message further comprises header information, wherein executing the software instructions further causes the apparatus to:
   duplicate the header information within a header of each PDU of the plurality of PDUs.

5. The apparatus of claim 4, wherein the header information comprises at least one of message type or transaction ID.

6. The apparatus of claim 1, wherein each PDU of the plurality of PDUs comprises a header, the header comprising an indication of whether the PDU is a final PDU of the plurality of PDUs.

7. The apparatus of claim 1, wherein each PDU of the plurality of PDUs comprises a header, the header comprising an indication of the number of PDUs in the plurality of PDUs and an index uniquely identifying the current PDU among the plurality of PDUs.

8. A method for communicating a radio resource control (RRC) message, the method comprising:
   by a wireless communication device:
   generating an RRC message;
   segmenting the RRC message into a plurality of segments;
   encapsulating the plurality of segments within a plurality of protocol data units (PDUs), wherein each PDU of the plurality of PDUs comprises one of the segments wherein respective PDUs of the plurality of PDUs include different segment identifiers and are associated with the same transaction identifier, wherein the transaction identifier identifies the PDUs that include the segments of the RRC message; and
   transmitting one or more signals comprising the plurality of PDUs.

9. The method of claim 8, wherein the plurality of PDUs are a plurality of RRC PDUs.

10. The method of claim 8, wherein the plurality of PDUs are a plurality of PDCP PDUs.

11. The method of claim 8, wherein the RRC message further comprises header information, the method further comprising:
    duplicating the header information within a header of each PDU of the plurality of PDUs.

12. The method of claim 11, wherein the header information comprises at least one of message type or transaction ID.

13. The method of claim 8, wherein each PDU of the plurality of PDUs comprises a header, the header comprising an indication of whether the PDU is a final PDU of the plurality of PDUs.

14. The method of claim 8, wherein each PDU of the plurality of PDUs comprises a header, the header comprising an indication of the number of PDUs in the plurality of PDUs and an index uniquely identifying the current PDU among the plurality of PDUs.

15. A non-transitory computer-readable medium storing software instructions that, when executed by a processor of a wireless communication device, cause the wireless communication device to:
    generate an RRC message;
    segment the RRC message into a plurality of segments;
    encapsulate the plurality of segments within a plurality of protocol data units (PDUs), wherein each PDU of the plurality of PDUs comprises one of the segments, wherein respective PDUs of the plurality of PDUs include different segment identifiers and are associated with the same transaction identifier, wherein the transaction identifier identifies the PDUs that include the segments of the RRC message; and
    transmit one or more signals comprising the plurality of PDUs.

16. The non-transitory computer-readable medium of claim 15, wherein the plurality of PDUs are a plurality of RRC PDUs.

17. The non-transitory computer-readable medium of claim 15, wherein the plurality of PDUs are a plurality of PDCP PDUs.

18. The non-transitory computer-readable medium of claim 15, wherein the RRC message further comprises header information, wherein the software instructions, when executed further causes the wireless communication device to:
    duplicate the header information within a header of each PDU of the plurality of PDUs.

19. The non-transitory computer-readable medium of claim 18, wherein the header information comprises at least one of message type or transaction ID.

20. The apparatus of claim 15, wherein each PDU of the plurality of PDUs comprises a header, the header comprising an indication of whether the PDU is a final PDU of the plurality of PDUs.

* * * * *